United States Patent [19]

Thatcher

[11] 4,278,100
[45] Jul. 14, 1981

[54] METHOD AND APPARATUS FOR SEPARATING TOBACCO FROM REJECTED CIGARETTES

[75] Inventor: Richard E. Thatcher, Chesterfield, Va.

[73] Assignee: Philip Morris Incorporated, New York, N.Y.

[21] Appl. No.: 72,646

[22] Filed: Sep. 5, 1979

Related U.S. Application Data

[63] Continuation of Ser. No. 953,859, Oct. 23, 1978, abandoned.

[51] Int. Cl.³ ............................................. A24C 5/36
[52] U.S. Cl. ...................................... 131/196; 209/3; 241/47
[58] Field of Search .............. 131/96, 109 B, 109 AB, 131/110, 145, 146; 241/47, 55, 56; 209/3, 21-23, 28-31, 36-37

[56] References Cited

U.S. PATENT DOCUMENTS

| | | | |
|---|---|---|---|
| 3,577,999 | 5/1971 | Pinkham | 131/96 |
| 3,941,684 | 3/1976 | Bradbury | 209/3 |
| 4,083,499 | 4/1978 | Thatcher | 131/96 X |
| 4,191,199 | 3/1980 | Sullivan | 131/96 |

Primary Examiner—Stephen C. Pellegrino
Attorney, Agent, or Firm—Watson, Leavenworth, Kelton & Taggart

[57] ABSTRACT

Tobacco in cigarettes rejected in the cigarette manufacturing operation is recovered by subjecting the cigarettes to a series of ripping actions which open the wrappings to expose the tobacco and a series of screening operations which result in effective recovery of 99+% of the tobacco and with almost no presence of wrappings residue material in the recovered tobacco, the wrappings material being separated to a different collection end point than the recovered tobacco.

8 Claims, 6 Drawing Figures

METHOD AND APPARATUS FOR SEPARATING TOBACCO FROM REJECTED CIGARETTES

This is a continuation, of application Ser. No. 953,859, filed Oct. 23, 1978, now abandoned.

BACKGROUND OF THE INVENTION

The manufacturing of cigarettes involves application of unusually high manufacturing standards and requirements for product quality. The cigarettes are made on high-speed manufacturing machines and even a momentary abberation in machine operation can result in the manufacture of substantial quantities of cigarettes which do not meet the requisite standards for product quality. For example, the wrapping in which the cylinder of shredded cigarette tobacco is enclosed may not sufficiently, tightly engage the tobacco to provide the cylinder with the required degree of firmness or alternatively, there may be an insufficient volume of tobacco within the cylinder. As a result, and by reason of constant monitoring of the manufacturing process, cigarettes which do not measure up to the set standards are rejected and collected and removed from the processing line to insure that no cigarettes below the desired standard or quality level are packaged and shipped for ultimate retail sale. Inasmuch as the tobacco in the cigarettes is in all respects satisfactory for its intended purpose, and due to the cost of tobacco, it is desirable that the tobacco in rejected in rejected cigarettes and/or "long ends" be reclaimed for further useful processing. In order to do so, requires that the tobacco be separated completely from the wrapping in which the cigarette has been formed and that such tobacco, when ultimately reintroduced into the cigarette manufacturing line, be substantially completely free of any residue of the wrapping and represent a substantially pure tobacco product. It will be understood that "wrapping" includes not only the paper cylinder in which the tobacco was wrapped, but the filter plug and filter wrap in the case of a filter cigarette as well as any combining and/or tipping paper as may be embodied in the cigarette. Any method and apparatus utilized for the purpose of effecting reclamation of the tobacco from rejected cigarettes should be such as to efficiently and economically result in separation of the tobacco from the wrapping, be as fully automated as possible, and result in providing a substantially pure tobacco end product containing, if any, only the barest trace of wrapping residue.

SUMMARY OF THE INVENTION

The present invention relates to the reclamation of tobacco from cigarettes which are rejected in the cigarette manufacturing line as not measuring up to the requisite manufacturing standards employed in the cigarette industry. As used herein, "cigarettes" is inclusive of unfiltered and filtered cigarettes as completely made as well as indeterminate lengths of tobacco rod or so-called "long ends". The invention involves the separation of the shredded tobacco filler of the cigarette from the wrappings in which the cigarette was formed, such wrappings being inclusive of a filter element, where appropriate, as well as any combining or tipping wrapping as may have been used to join the filter plug to the paper cylinder in which the tobacco itself is contained. In particular, the present invention is concerned with both a method and apparatus for accomplishing the foregoing. The invention is characterized by a number of advantages beyond merely the recovery of the tobacco as such. It allows for very substantial energy savings in carrying out the recovery operation and improves the working environment particularly from the standpoint of noise and dust abatement, the system being closed and operating under negative pressure.

In accordance with the present invention, which is intended to provide for a continuously operated separation of tobacco from the cigarette wrappings, rejected cigarettes are fed into a feeder unit and passed through a moisturizing chamber wherein the cigarettes can be moistened to a level of about 14% or 15% by weight moisture so as to facilitate further and subsequent handling of the cigarettes in the separation operation. It will be understood that moisturizing of the shreds renders them more pliable for processing. Very dry shreds tend to break up and dust, whereas, too moist shreds can mildew and branch together which is undesirable with regard to actual handling of the tobacco and ultimate cigarette making. Advantageously, moisture to the levels indicated is added to avoid tobacco degradation during the entire processing of the tobacco right up to packaging of the manufactured cigarettes. From the moisturizing chamber, the cigarettes are delivered through a metering unit, desirably a metering conveyor belt onto a primary screening unit which screening unit is a vibrating screen structure and along which the cigarettes are advanced from entry towards a discharge end of the screening unit. The primary screen is a plural screen component, i.e., it has upper and lower screens, the upper screen being employed to retain large items of trash as may inadvertently find their way into the system, e.g., bolts, brooms, etc. The cigarettes pass through the upper screen onto the lower screen and any tobacco which has been loosened therefrom passes through the second screen, the cigarettes in either whole or broken from being retained on the lower screen. About 8% tobacco passes through the lower screen and is in condition for collection therefrom without further processing prior to sending it to the cigarette maker. The cigarettes retained on the discharge end of the lower screen, and this includes wrappings therefor, are advanced by the vibration action of the screen to discharge at an end of the lower screen and delivery into and passage through a first stage torous ripper fan unit which further rips and/or macerates the cigarettes to expose the tobacco therein, the thus treated cigarettes discharging from the first stage fan unit to a first stage tengential separator unit disposed above a first stage screening unit or aerodynamic vibrator separator. On discharge from the first stage tangential separator unit, the mass of tobacco and wrappings is subjected to further screening action in which approximately 76% of the tobacco contained therein passes through the screen unit for ultimate collection with unbroken or not fully broken cigarette pieces, tobacco clumps and the cigarette wrapping material remaining on top of such screening unit. During the course of the travel of the tobacco and wrapping material on the first screening unit, they pass under the influence of a suction or aerodynamic flow which functions to convey to an uptake disposed above the screening unit at a location about half way down the run of the screen paper, filter material, tipping wrap, etc., contained in the mass present on the screen. Any tobacco and wrapping material remaining on the first stage screening unit, i.e., which has not been separated and conveyed to separate collection locations is discharged therefrom at the end of the screening unit and is then passed through a second stage torous ripper fan unit which further rips the cigarette mass and such mass is then delivered to a second stage tangential separator unit which delivers the mass onto a second stage screening unit which functions like the first stage screening unit to effect tobacco-wrapping separation. While on such second stage screening unit, the mass is subjected to a screening action to remove approximately 12% of the tobacco with such screening unit also being provided with suction or aerodynamic lift means which effects the additional removal of paper and other wrapping materials, particularly heavy filter material particles and pieces.

Any wrapping material inclusive of paper and filter material, which has been removed from the first and second screening units by means of the vacuum uptakes are conveyed to a third stage tangential separator unit which discharges them onto a final or trash screening unit which retains thereon the wrapping material, but which is sized to pass through any fine tobacco particles as remained with the wrapping residue. In such screening operation at the trash screening unit, approximately 2% of the tobacco contained in the cigarettes is recovered. The tobacco contained in the cigarettes is recovered. The tobacco which was passed through the first, second and third and preliminary screening units is continuously collected on a conveyor running beneath such screening units and is delivered to a collection point from whence it is delivered to an end point of use such as a cigarette manufacturing operation.

In accordance with the invention, the entire processing takes place in the same environment, that is, the separation is effected in a single space employing a closed circuit air path so that there is a continuous recycling of the air in the space for use in the operation of the torous ripper fan units and tangential separator units. This means that only a minimum (about 10% of system make up outside air need be brought in and therefore handled in the operation with concurrent reduction in the amount of energy required to effect the processing as compared to prior art processing operations in which the system air has generally been exhausted to elaborate dust collectors outside the working space, the air therefore being discharged so that a totally fresh supply of air must be made to the working space.

The invention accordingly comprises the several steps and relation of one or more of such steps with respect to each of the others thereof, and the apparatus having the features of construction, combination of elements and arrangement of parts which will be exemplified in the construction hereinafter set forth and the scope of the invention will be indicated in the claims.

BRIEF DESCRIPTION OF THE DRAWINGS

A fuller understanding of the nature and the objects of the present invention will be had from the following description taken in conjunction with the accompanying drawings in which.

Throughout the description, like reference numerals are used to denote like parts in the drawings.

DESCRIPTION OF THE PREFERRED EMBODIMENTS

The apparatus of the present invention is intended for use in recovering useable tobacco from rejected cigarettes returned from the cigarette manufacturing operation. It will be understood that the purpose is to take the wrapped cigarettes including "long ends" and separate the shredded tobacco from the paper wrappings in which it is enclosed, "wrappings" including any filter element and filter enclosure materials as well without degrading the tobacco filler for reuse in manufacturing cigarettes and without returning with the recovered tobacco any but minimum trace presence of wrappings materials.

Figure 1:
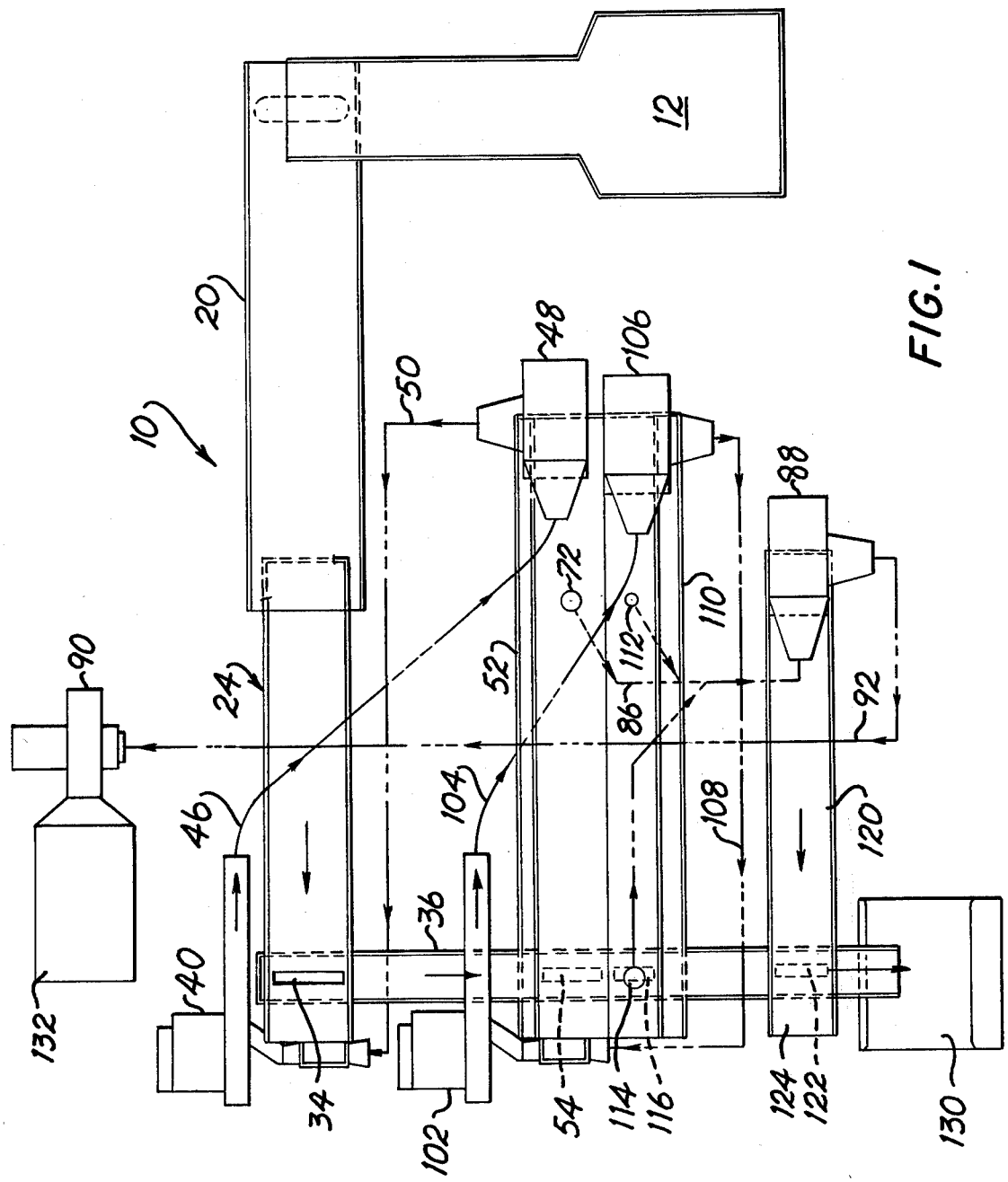
FIG. 1 is a plan view of apparatus for separating cigarette tobacco from the wrappings in which they are formed and in accordance with the present invention.
Figure 2:
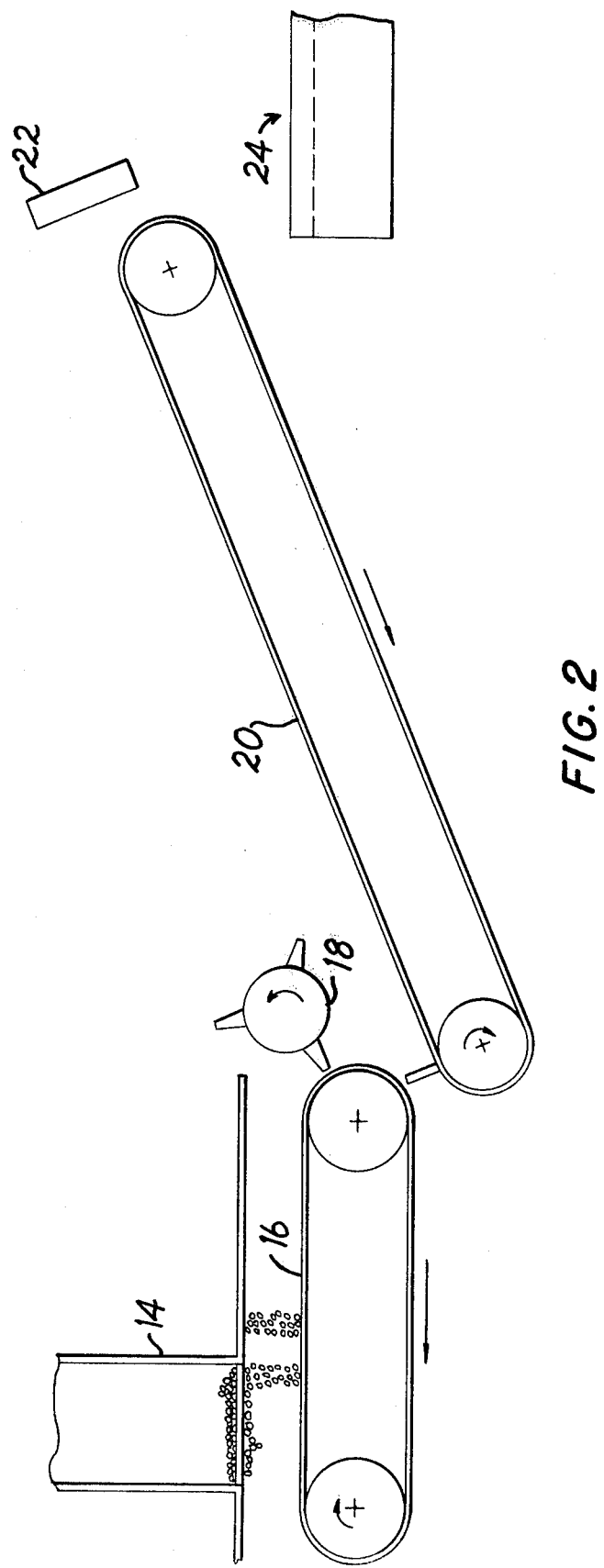
FIG. 2 is a fragmentary side elevational view showing the initial section of the FIG. 1 apparatus and in particular the metering means by which a material flow of rejected cigarettes are delivered to the preliminary screening unit.

Referring now to FIG. 1, rejected cigarettes are introduced into the apparatus 10 by delivery to station 12 of the cigarettes and at which station, the cigarettes can be moistened by injection with low pressure steam in known manner and for the purpose discussed earlier. As can be further seen with reference to FIG. 2, the cigarettes at the entry station are following moistening passed through a vertically oriented chute 14 and pass onto a moving belt 16, being transported from left to right and passing off the belt 16 onto the vaned metering roller 18 which in turn delivers metered flow of the cigarettes onto the upwardly inclined conveyor belt 20, along which passes a generally uniform depth of cigarettes to thus provide a uniform feed of cigarettes to the subsequent processing components of the apparatus. The speeds at which belts 16 and 20 and metering roller 18 operate can be controlled as desired to provide optimized operation of the overall apparatus. At the top of the conveyor belt 20, a magnet 22 is disposed to remove any metallic foreign objects such as wrenches, bolts and the like as may accidentally find way into the recovery process from the time the rejected cigarettes are collected at the cigarette makers and delivered at entry station 12. Conveyor 16 can in one form be an endless belt running between pulleys spaced on centers at about 30" with the pulleys rotating at a speed of about 3–5 RPM. The metering wheel 18 which it will be understood, initiates breaking up of the cigarettes rotates at a speed, e.g., to provide about a ¼" to ½" layer of cigarettes on conveyor 20 when the latter is travelling at about 100 FPM.

Figure 3:
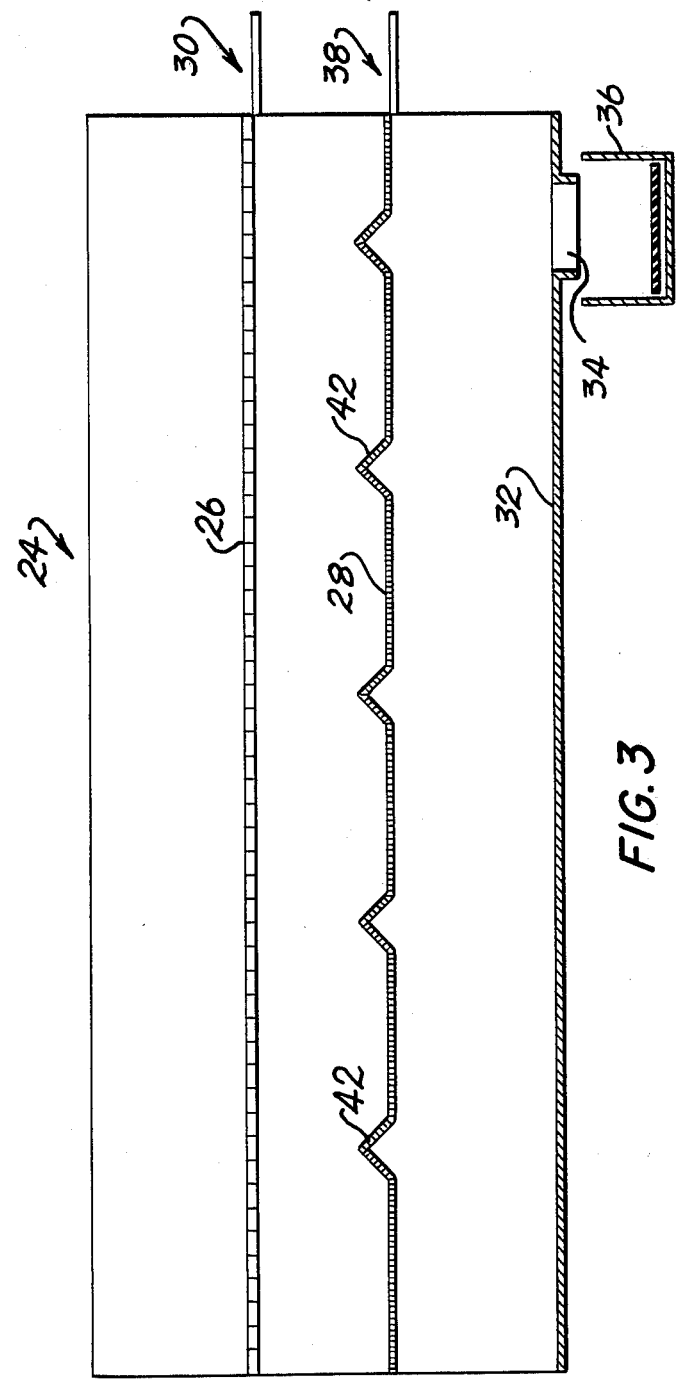
FIG. 3 is an elevational view in section of the preliminary screening unit showing the upper and lower levels thereof and the manner in which a certain amount of tobacco is recovered for collection with the remainder of the tobacco and wrappings as well as large trash being removed at the end of the screening unit for discharge in the case of large trash and further processing in the case of tobacco and wrappings.
Figure 4:
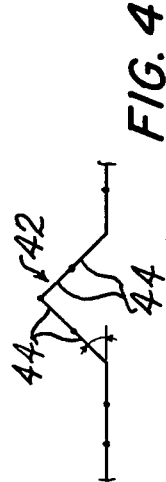
FIG. 4 is a side elevational view of a fragment of the lower screen of the preliminary screening unit showing how same is stepped to insure pass through of tobacco shreds without any bridging or building up of same at the screen apertures.

From the conveyor belt 20, the cigarettes drop onto a preliminary vibrating screening unit 24 further constructional feature of which are shown in FIGS. 3 and 4. The preliminary screening unit 24 is provided with an upper screen member 26 and a lower screen member 28, being intended to provide a rough preliminary screening to recover about 8% shredded tobacco filler from the cigarettes, it being understood that the handling of the cigarettes thus far having resulted in loosening of the tabacco in the wrapped cigarettes to provide for such recovery along with a certain minor breaking up of the cigarettes on the conveyor belts, metering roller and handling on upper screen member 26. Screening unit 24 can be vibrated in known manner and have a vibration stroke, e.g., in the range 24–29/32". The upper screen member 26 can comprise a screen of 2"×2" mesh and functions to pass whole cigarettes and any broken cigarette parts, filters etc. through to the lower screen member but it is designed to retain large objects such as brooms and other foreign object trash which passes off the end of upper screen 26 as at 30 to a point of trash disposal. Lower screen 28 desirably is a 3½×3½×0.040 mesh, i.e., it has 3½ wires to the inch, each wire being 0.040" thick. Lower screen 28 thus allows tobacco shreds to pass through to the bottom 32 and ultimate conveyance to opening 34 from whence the approximate 8% of tobacco separated drops onto collection conveyor 36. The cigarettes remaining on lower screen 28 pass off therefrom as at 38 and enter a first stage torous fan unit 40 which will be described shortly.

As seen in FIGS. 3 and 4, the lower screen 28 of the preliminary screening unit 24 includes a plurality of transversely arranged bumps or inclined sections 42 therein which function to present vertical or upwardly inclined access openings 44 to the tobacco present on the lower screen to allow the tobacco to pass through and fall from the lower screen. This arrangement is provided to prevent tobacco fibers from spanning the purely horizontal openings during its passage from left to right on the screen which would prevent its collection at this early stage in the processing, i.e., such feature obviates the bridging and hanging up of the tobacco in clumps on the screen. The bumps or inclines 42 at the same time do not act to inhibit travel of large cigarette pieces, filters or whole cigarettes on the lower screen so that such material readily can climb over the bumps and advance to discharge at 38 and into the first stage torous ripper fan 40. It will be appreciated that the bumps could assume other forms than the triangular shape depicted. They could for example have inclined entry and exit sections with an elevated flat section therebetween.

With reference again to FIG. 1, the cigarettes passing from the lower screen 28 enter the torous ripper fan unit 40 in which they are subjected to a ripping action which opens the wrappings to loosen the tobacco therefrom and also to further break up unbroken cigarettes as well as to break off filters from the tobacco section. The torous ripper fan unit 40 is of known construction and includes an impeller rotating at high speed in a housing that defines a torous transit course of travel for the cigarettes within the unit. The cigarettes enter the unit at an angle to the axis of impeller rotation and contact the impeller vanes near the tips thereof to allow for maximum contact with the impeller but without causing undue degradation of the filler tobacco. The violent action of the travel of the cigarettes in the torous travel path plus the impact action of the vane tips create an optimized ripping action on the cigarettes. In such handling within the unit, the lighter tobacco particles migrate to the space between the impeller tip rotation course and the housing wall and thereby lessens the tendency to degrade the tobacco. Furthermore, the housing can include rods disposed on the path of the discharge flow against which the cigarettes impact to further break or rip same.

Figures 5, 6:
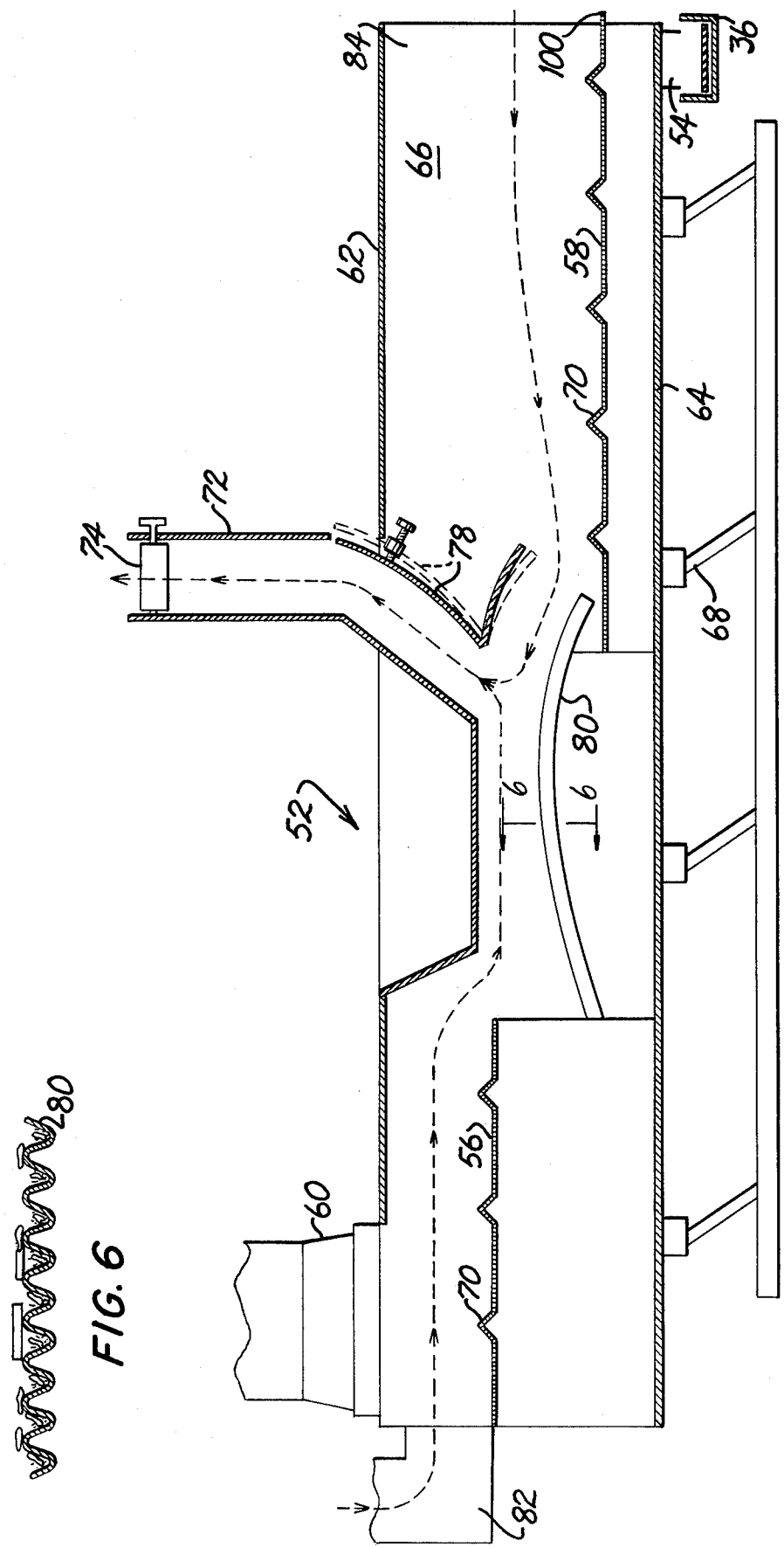
FIG. 5 is a side elevational view of the first stage screening unit depicting the upper and lower screening sections therein as well as the manner in which an aerodynamic lift or flow is established to remove the wrappings material but allow passage through the screens of the tobacco for collection.
FIG. 6 is a sectional view taken along the line 6—6 in FIG. 5 depicting a vibrating, corrugated section plate employed to advance tobacco from the screen unit upper section to its lower section.

The thus ripped cigarettes are then conveyed from the ripper fan unit 40 through conduit section 46 to a first stage tangential separator unit 48. This unit functions to separate the broken up cigarettes from the air stream issuing from fan unit 40, the air being returned as by conduit section 50 to the section side of fan unit 40 and the broken up cigarettes being deposited on a first stage screening unit 52, details of which are shown in FIGS. 5 and 6. In the screening unit 52, further separation of tobacco from its wrappings is effected to the extent that about 76% of the tobacco originally in the cigarettes is recovered in this operation, the tobacco passing out of the screening unit through opening 54 and onto the cross conveyor 36 fan collection.

With reference now to FIG. 5, the first stage screening unit has an upper screen section 56 and a lower screen section 58, the former receiving discharge of the broken cigarettes thereon from separator unit 48, the lower housing part 60 of the separator unit being depicted. The first stage screening unit as will be noted is enclosed at the top as by top wall 62 and at the bottom by bottom wall 64, there also being side walls 66 only one of which is shown, the unit being resiliently mounted and vibrated by known means as at 68. Both screen section 56 and screen section 58 are of mesh designed to pass through tobacco shred size particles but to retain large cigarette parts wrappings and the like and are provided with bumps 70 which are of the same construction and function as those provided on the preliminary screening unit. At about mid-length of the screening unit, an upstake duct 72 is provided for the purpose as will be described, the duct 72 having a control damper 74 and a selectively positionable vane portion 78 which can be adjusted between the position shown in solid and dashed lines. Intervening the upper and lower screen sections 56, 58 is a conveyor grid 80 of sinuous cross-section as depicted in FIG. 6 and which serves to convey tobacco between the two screen sections in the manner as will appear. The screening unit also includes a rear air inlet as at 82 and an air inlet 84 at the front through which two oppositely directed streams of air are drawn into the unit, the streams merging below the duct 72 into a single stream which flows upwardly through the duct and into duct section 86 leading to a further tangential separator 88, the air flow being induced by fan unit 90 which has suction connection by means of conduit 92 to separator 88. The purpose of providing the air stream flow in a horizontal course within the first-stage screening unit is to keep free paper moving above the tobacco present on the screen section 56, 58 inasmuch as the free paper would if it settled on the screen section block same and thereby prevent passage of the tobacco through to bottom wall 68. For example, the discharge from first stage separator unit 48 onto screen section 56 is as much as 70% free paper. Such paper if not kept in motion would quickly block the screen section.

From screen section 56, tobacco (which has not passed through screen section 56), filters and cigarette pieces pass by vibration transportation onto grid member 80 which as seen in FIG. 6 is of sinuous cross section, the height of the grooves and the span therebetween being about ⅝". Tobacco shreds settle in the grooves, whereas, the large filter and cigarette pieces bridge the peaks of the corrugation as does any paper particles which are kept floating above the grid by the aerodynamic air stream flow. The paper is carried away in the air stream and up into the flow in duct 72. Grid 80 thus lessens the amount of paper that can be carried out into the stream of tobacco, filters and pieces issuing off the grid and onto screen section 58. On screen section 58, tobacco shreds again pass therethrough down to bottom 64 while pieces of cigarettes and filters are transported to the end of the section for discharge from the first stage screening unit as at 100.

The two air streams flowing in the first stage screening unit provide an aerodynamically balanced non-turbulent flow in such unit which is capable of entraining the lighter paper particles but picking up little if any tobacco as such or filters. Vane 78 can be employed to adjust the flow to achieve proper balance.

From the first stage screening unit 52, cigarette pieces, filters, etc. discharging at 100 are delivered to a second-stage torous ripper fan unit 102 wherein further breaking up of such material is effected with discharge from such unit being through duct 104 to a second stage tangential separator 106, the discharge of air from the last-mentioned unit being by way of duct 108 to the suction of fan unit 102, and the tobacco, filters, etc. discharging onto a second stage screening unit 110. Second-stage screening unit 110 is in all respect like the screening unit 52 except it is provided with two suction ducts 112, 114 which suck up paper and connect with duct section 86 for delivery of such paper to separator unit 88. The approximately 12% tobacco recovered in the secondary screening unit passes through bottom wall opening 116 and onto conveyor 36. After passing along the lower screen section of screening unit 110 the only material remaining on such screen is filters, filter material parts and possibly some paper. Therefore, discharge from such lower screen section can be to a trash collector. The balance of any recoverable tobacco of 3+% is now present in the air stream flow delivered to separator unit 88. In such unit the tobacco and other solids material is deported on a vibrating third or trash screening unit 120 which screens through such tobacco to opening 122 and onto conveyor 32 with the trash remaining on the screen (filter material pieces, paper, etc.) being discarded at 124.

The tobacco collected on conveyor 32 is transported thereon and discharged at collection station 130 from whence it can be taken to the manufacturing operation.

Fan unit 90 serves to exhaust air from the separator unit 88 and discharges such air through dust collector 132 back into the working space.

What is claimed is:

1. A method for separating shredded cigarette tobacco filler from the wrappings of formed cigarettes to recover such tobacco for further useful processing, said method comprising subjecting the cigarettes to a ripping operation to break up said cigarettes and rip the wrappings thereof an thereby loosen the tobacco therein, depositing the cigarettes on a vibrating screen unit sized to pass tobacco shreds therethrough but to retain the wrappings and tobacco therein while flowing two air streams in generally horizontally disposed courses from opposite ends of the screening unit, to maintain an aerodynamically induced suction lift condition over said screening unit to float the wrapping materials a distance above the surface of said screening unit, the said two streams having a point of merger intermediate said ends from whence said streams flow vertically codirectionally upwardly to carry off wrapping materials entrained therein, and collecting the tobacco passing through said screening unit.

2. The method of claim 1 in which prior to subjecting the cigarettes to said ripping operation, said cigarettes are subjected to a preliminary screening operation to separate any already loosened tobacco present in the cigarettes from said wrappings.

3. The method of claim 2 in which prior to subjecting the cigarettes to said preliminary screening operation, they are moistened with wet steam.

4. The method of claim 1 further comprising collecting the wrappings, tobacco clumps and any cigarette pieces remaining on said screening unit and subjecting them to at least one further ripping operation to effect further break-up of same, and depositing such further ripped material on a second vibrating screen unit sized to pass tobacco shreds therethrough but to retain wrappings thereon while flowing two air streams in generally horizontally disposed courses from opposite ends of said second screening unit, to maintain an aerodynamically induced suction lift condition over said second screening unit to float the wrapping materials a distance above the surface of said screening unit, the said two streams having a point of merger intermediate said ends from whence said streams flow vertically codirectionally upwardly to carry off wrapping materials entrained therein.

5. The method of claim 1 further comprising selectively altering the flow rate of said two streams to maintain the floatation movement of said wrappings above said screening unit and at a rate of movement which is faster than the tobacco shreds pass through said screening unit.

6. An apparatus for separating shredded cigarette tobacco filler from the wrappings of formed cigarettes to recover such tobacco for further useful processing, said apparatus comprising a torous ripper fan unit through which the cigarettes can be passed to effect ripping of same to tear open the wrappings thereof and loosen the tobacco therefrom, a tangential separator unit, there being conduit means connecting said separating unit with said torous ripper fan unit for conveying the ripped cigarettes from said fan unit to said separator unit, a vibrating screening unit, the separator unit discharging the ripped cigarettes onto said vibrating screening unit, said vibrating screening unit having screen means sized to pass tobacco shreds therethrough but to retain wrapping materials thereon, and means for flowing two air streams in generally horizontally disposed courses from opposite directions of said screening unit, for maintaining an aerodynamically induced suction lift above said screen to float the wrappings a distance above the surface of said screen means, and a duct member disposed intermediate the ends of said screening unit, said oppositely directed air stream merging at said duct and flowing in a common upwardly directed flow course therethrough to carry off any wrapping materials entrained in said streams.

7. The apparatus of claim 6 in which said vibrating screening unit is elongated, and said screen means comprises an upper screen disposed at the entry end of said screening unit, and a lower screen disposed at the discharge end of said screening unit, there being a transport grid disposed between said upper and lower screens for conveying materials from said upper screen to said lower screen, said transport grid comprising an elongated member having a transverse sinusoidal profile comprised of adjacent grooves and peaks, the tobacco shreds tending to collect in said grooves during transport of same along said grid, the spacing between said peaks being such that wrappings materials bridge said peaks during the course of transport of same along said grid.

8. The apparatus of claim 6 in which said duct is provided with a duct segment selectively movable to alter the entrance throat size of said duct, thereby selectively controlling the condition of suction lift maintained above said screening unit.

* * * * *

UNITED STATES PATENT AND TRADEMARK OFFICE
Certificate

Patent No. 4,278,100            Patented July 14, 1981

Richard E. Thatcher

Application having been made by Richard E. Thatcher, the inventor named in the patent above identified, and Philip Morris, Inc., New York, N.Y., a Corp., of Va., the assignee, for the issuance of a certificate under the provisions of Title 35, Section 256, of the United States Code, adding the name of Horace L. Odom as a joint inventor, and a showing and proof of facts satisfying the requirements of the said section having been submitted, it is this 27th day of July 1982, certified that the name of the said Horace L. Odom is hereby added to the said patent as a joint inventor with the said Richard E. Thatcher.

Fred W. Sherling
*Associate Solicitor.*

UNITED STATES PATENT AND TRADEMARK OFFICE
CERTIFICATE OF CORRECTION

PATENT NO. : 4,278,100
DATED : July 14, 1981
INVENTOR(S) : Richard E. Thatcher

It is certified that error appears in the above—identified patent and that said Letters Patent is hereby corrected as shown below:

On the cover page of the patent, immediately below "United States Patent", "Thatcher" should read -- Thatcher et al. --; at [75], "Inventor: Richard E. Thatcher, Chesterfield, Va." should read -- Inventors: Richard E. Thatcher, Chesterfield, Va.; Horace L. Odom, Bon Air, Va.--

Column 1, line 30, cancel "in rejected" second occurrence.
Column 2, line 18, change "branch" to --bunch--.
" " line 37, change "from" to --form--.
" " line 49, change "tengential" to --tangential--.
" " line 63, after "screen" insert a comma --,--.
Column 3, lines 24 & 25, cancel "The tobacco contained in the cigarettes is recovered."
Column 5, line 13, change "tabacco" to --tobacco--.
Column 6, line 18, change "section" (2nd occurr.) to --suction --
" " line 26, change "fan" to --for--.
" " line 39, after "parts" insert a comma --,--.
" " line 43, change "upstake" to --uptake--.
Column 7, lines 52 & 55, change "32" to --36--.
" " Claim 1, line 68, change "an" to --and--.
Column 8, Claim 5, line 45, cancel "and".

Signed and Sealed this

Third Day of August 1982

[SEAL]

Attest:

GERALD J. MOSSINGHOFF

Attesting Officer  Commissioner of Patents and Trademarks